United States Patent [19]

Mendiratta et al.

[11] Patent Number: 4,634,761

[45] Date of Patent: Jan. 6, 1987

[54] CONTINUOUS METHOD FOR ISOLATING POLYMER RESIN FROM SOLUTION WHEREIN ORGANIC SOLVENT RESIN SOLUTION IS FED INTO AQUEOUS FEED

[75] Inventors: Ashok K. Mendiratta, Schenectady; Wayne F. Morgan, Mechanicville, both of N.Y.

[73] Assignee: General Electric Company, Schenectady, N.Y.

[21] Appl. No.: 766,225

[22] Filed: Aug. 16, 1985

Related U.S. Application Data

[63] Continuation-in-part of Ser. No. 681,457, Dec. 14, 1984, abandoned.

[51] Int. Cl.⁴ .............................................. C08J 3/10
[52] U.S. Cl. ................................. 528/500; 528/491; 528/492; 528/497; 528/498; 528/499; 528/502
[58] Field of Search ............... 528/500, 499, 491, 492, 528/497, 498, 502, 196

[56] References Cited

U.S. PATENT DOCUMENTS

| | | |
|---|---|---|
| 3,267,074 | 8/1966 | Wood . |
| 3,590,026 | 6/1971 | Carlson et al. ................. 260/94.7 |
| 3,954,713 | 5/1976 | Schnöring ..................... 260/47 XA |
| 4,205,162 | 5/1980 | Herscovici ......................... 528/499 |
| 4,408,040 | 10/1983 | Flock et al. ....................... 528/500 |
| 4,423,207 | 12/1983 | Flock et al. ....................... 528/499 |

FOREIGN PATENT DOCUMENTS 0095670 5/1983 European Pat. Off. .

Primary Examiner—Harold D. Anderson
Attorney, Agent, or Firm—Francis T. Coppa; James C. Davis, Jr.; James Magee, Jr.

[57] ABSTRACT

A continuous process for isolating polymer resin from organic solvent solution feed is provided wherein the organic solvents in the feed are volatilized in an aqueous solution to form polymer granules and the size of these granules is controlled by interrupting the feed of the organic solvent solution.

22 Claims, No Drawings

CONTINUOUS METHOD FOR ISOLATING POLYMER RESIN FROM SOLUTION WHEREIN ORGANIC SOLVENT RESIN SOLUTION IS FED INTO AQUEOUS FEED

This application is a continuation-in-part application of Ser. No. 681,457, filed Dec. 14, 1984 now abandoned.

CROSS-REFERENCE TO RELATED APPLICATIONS

This invention is related to subject matter disclosed in copending application Ser. No. 751,777, filed July 5, 1985, assigned to the same assignee as the present invention, the contents of which are incorporated herein by reference.

BACKGROUND OF THE INVENTION

This invention relates to a method for recovering polymer resins from solution. More particularly, it relates to a continuous process for isolating a polymer resin from an organic solvent solution feed by admixing the solution with an aqueous solution and volatilizing the organic solvents to provide solid polymer granules of a high bulk density.

There are several methods which have been suggested for separating thermoplastic resins from organic solutions. The majority of these processes are energy intensive, requiring large quantities of steam to accomplish solvent removal. Those separation processes which are energy conservative either provide solid product of a low bulk density, provide particulate product with undesirable impurities or require complex operating equipment.

The processes described in U.S. Pat. Nos. 4,408,040 and 4,423,207 provide methods for separating polymers from solution wherein said solution is atomized with steam within an agitated vessel of hot water. The solvent is flashed off within the hot water leaving a slurry of solid polymer. These processes provide an energy efficient means for separating the polymer from solution; however, these processes require unique equipment, such as a spray nozzle designed to disperse the polymer. In addition, a polymer particulate of a higher bulk density, a narrower size distribution and lower concentration of retained volatiles is desired.

The process described by Kohyama et al. in U.S. Pat. Nos. 4,452,976 obtains polymer products of high density by feeding a polymer solution into water in conjunction with a recycled product slurry which has been treated by a wet pulverization process. The polymer solution is then devolatilized within the water/product slurry. This process is very energy intensive in that it requires a high recycle rate to prevent clogging of the apparatus. In addition, complex equipment is required (wet pulverizer) to perform the process.

Methods which utilize simplified equipment to obtain polymer solids of a higher bulk density are described in copending application Ser. No. 751,777. In this process, separation of polymer resin is achieved by admixing an organic solution of the polymer with an aqueous slurry of polymer particles and volatilizing the organic solvents in solution. This process is efficient and provides good granular product; however, there is room for improvement. To operate continuously, a continuous source of an aqueous polymer slurry is required to avoid the formation of large polymer granules. These polymer particles provide agglomeration sites which are the starting point for granule formation. Without the addition of these polymer particles, polymer agglomeration sites will form initially and continue to grow within the admixture without providing new agglomeration sites. As granules are recovered from such a process, the unrecovered granules grow forming large, undesirable granules. A separate apparatus is needed to provide a continuous source of this slurry.

In an embodiment of the invention described in Ser. No. 751,777 a separate source for the aqueous slurry of polymer particles is not required. However, this embodiment operates semi-continuously to avoid the formation of large granules. Upon formation of particles of a desired size, the process is stopped.

A continuous process which does not require a source of an aqueous slurry of polymer particles to provide high bulk density polymer granules with a narrow size distribution is desired.

SUMMARY OF THE INVENTION

This invention provides a continuous process for isolating polymer resin from organic solvent solutions without the use of an aqueous polymer particle slurry, said method comprises:

(a) feeding, with agitation, an organic solvent solution of about 1 to 50% by weight polymer resin into an aqueous solution feed to provide an admixture;

(b) matching the feed rates for said aqueous solution and said organic solution to provide a weight ratio of water to polymer within the admixture having a value of from about 2–50;

(c) volatilizing the organic solvents within the admixture at a rate sufficiently low to permit solidification of the polymer resin followed by agglomeration of said polymer resin to form polymer granules;

(d) recovering solid polymer granules and said aqueous solution from said admixture;

(e) interrupting the feed of said organic solvent solution of polymer resin upon formation of polymer granules within said admixture of a desired average size to dry said polymer granules; and (f) resuming the feed of said organic solvent solution of polymer resin upon drying substantially all of the polymer granules within said admixture.

OBJECTS OF THE INVENTION

An object of the present invention is to provide a continuous process by which polymer resins are isolated from organic solutions with a low consumption of energy.

Another object of the present invention is to provide a continuous process for isolating polymer resins from solution which minimizes exposure to high temperatures which can be deleterious to product quality.

Another object of the present invention is to provide a continuous process for isolating polymer resins from solution by the agglomeration of polymer resin which does not require a separate source of polymer particulates in the form of an aqueous slurry.

Another object of the present invention is to obtain solid polymer granules of a high bulk density, a low moisture content, a low residual solvent content and a narrow size distribution.

Another object of the present invention is to obtain solid polymer granules of an optimum size, morphology and size distribution for drying and subsequent downstream processing without utilizing a recycle stream.

Still another object of the present invention is to provide a continuous process for isolating polymer from solution which permits better control over particle size and particle size distribution.

DETAILED DESCRIPTION OF THE INVENTION

The polymers which can be isolated from organic solvents by this process in solid, granular form generally have a molecular weight average above about 200 and typically range from about 10,000 to 50,000. The degree of polymerization can range from dimers to above 10,000. These polymers can be obtained by homopolymerization or copolymerization, by condensation reactions, addition reactions, etc. The term "polymers" as used herein refers to thermoplastic polymers, i.e. those which become plastic and flowable under the action of pressure and heat, and elastomers, i.e. those which stretch under tension and/or retract rapidly and recover their original dimensions. Examples of suitable thermoplastics include: polycarbonates, including cyclic polycarbonates; polystyrene, including high impact polystyrene and brominated derivatives of polystyrene; polyphenylene ethers; polyetherimides, polyesters, including polyethylene terephthalates and polybutylene terephthalates. Examples of suitable elastomers include ethylene propylene rubbers such as diene modified ethylene propylene rubbers, Kraton rubbers and butadiene rubbers. All of the above mentioned polymers possess the common property of being soluble in at least one organic solvent solution from which they may be isolated.

This invention is based on the discovery of a method for preventing further agglomeration of polymer resin onto unrecovered polymer granules within an admixture of an aqueous solution feed and an organic solution feed. This is accomplished by volatilizing all of the organic solvent within the admixture so as to dry the unrecovered polymer granules. Once dried, agglomeration will not take place on the granule surface. This permits new agglomeration sites to form in the presence of the unrecovered polymer granules upon resuming the organic solvent solution feed and volatilization of the organic solvents. An aqueous slurry of polymer particles is not required to operate continuously.

The organic solvent solution feed which contains the polymer resin is preferably comprised of organic solvents which have a boiling point below 100° C. at 1 atmosphere. Although organic solvents with boiling points higher than 100° C. can be utilized, a significant loss in efficiency of the process will result due to the large quantities of water which are vaporized. Where the organic solvent forms an azeotrope with water, the loss of efficiency will not be as great. Examples of solvents from which polymer resins may be isolated in accordance with the process disclosed herein are hexane, chlorinated and brominated hydrocarbons having from 1 to 2 carbon atoms, e.g., methylene chloride, 1,1,2,2-tetrachloroethane, 1,2-dichloroethylene, chlorobenzene, chloroform, dichlorobenzene, 1,1,2-trichloroethane and aromatic hydrocarbon solvents such as benzene, xylene, toluene, pyridine, mesitylene, and the like. Mixtures of the above solvents are also suitable and preferably, the solvents in such mixtures have boiling points within about a 40° C. range. Methylene chloride is the preferred organic solvent for use with polycarbonate resin. Toluene is the preferred solvent for both polystyrene and polyphenylene ethers.

According to the present process there may be conveniently used organic solvent solutions having concentrations of polymer resin of up to approximately 50% by weight polymer. Organic solvent solutions of a higher concentration will be difficult to handle and disperse in the aqueous feed due to their high viscosity and stickiness. The most preferred concentrations of polymer resin within the organic solvent solution feed fall within the range of about 10 to 30 weight percent. This range applies to polycarbonate, polystyrene, polyphenylene ethers, polyesters, ethylene propylene rubbers, polyetherimides, Kraton rubbers, etc. A preferred concentration range of polymer resin when the polymer is elastomeric, such as ethylene propylene rubbers and the like, is about 5 to 20 weight percent.

Feed solutions with lower concentrations of high molecular weight polymer resin, which are directly obtained from synthesis processes carried out in the presence of a solvent, are particularly suitable for use in the practice of this invention. Exemplary of such solutions are those obtained by interfacial polycondensations of phosgene and bisphenol-A to produce polycarbonates, preferably using methylene chloride as the solvent and in general containing up to about 30% by weight of a polycarbonate resin.

The aqueous solution feed preferably contains only water. This aqueous solution may contain polymer solids and still achieve some of the desired objects such as controlling the particle size and particle size distribution. However, a separate source for these solids would be needed, as is required in copending application Ser. No. 751,777.

Admixing the aqueous feed and the organic solvent solution feed containing polymer resin may be conveniently achieved within any unbaffled vessel by means of an impeller. Baffles within the vessel may interfere with the agglomeration process and may not be desired. Sufficient admixing can be obtained within an unbaffled vessel by rotating an impeller at a tip speed of at least about 5 feet per second, with preferred tip speeds falling within the range of about 10 to 70 feet per second.

The feed rates for the aqueous solution and the organic solvent solution are matched so as to provide a weight ratio of water to polymer within the admixture including solids and resins, at a value within the range of about 2.0 to 50 and preferably 3-20 during this process. Weight ratios below a value of 2.0 will cause the admixture to be highly viscous and the high solids content of the effluent slurry will be difficult to handle. Weight ratios providing a value above 50 encourage high volatilization rates for the organic solvents. Maintaining the volatilization rate at a value sufficiently low to permit the polymer resin to agglomerate is difficult at such high ratios.

Volatilization of the organic solvents commences immediately after admixing the aqueous solution feed and the organic solvent solution feed. Volatilization of the organic solvents at the proper rate is achieved by heating the admixture to a temperature within the range of from about 10° C. below to 30° C. above the boiling point of the organic solvents within said organic solvent solution.

The temperature utilized is principally determined by the organic solvents within said organic solvent solution; however, the temperature should not exceed the glass transition temperature of the polymer. The preferred temperatures fall within the range of about the boiling point of the organic solvents to 10° C. above the boiling point of these solvents. For methylene chloride, the most preferred range is 35° C. to 55° C. at about one atmosphere pressure. For toluene, an azeotrope forms with water and the most preferred range is about 80° C. to 100° C. and for hexane, the most preferred range is about 60° C. to 75°C., at about one atmosphere pressure. The admixture may be maintained under vacuum or under pressure. Pressures of from 0.1-2 atmospheres may be conveniently utilized; however, pressures outside this range can be utilized as desired.

The rate of volatilization determines whether the polymer resin within the organic solution agglomerates onto the polymer solids within the admixture or solidifies to form new solid polymer particles or forms a sticky mass.

In the absence of agglomeration sites, the polymer resin within the organic solution feed will solidify to form polymer particles at most volatilization rates. These particulates can provide agglomeration sites for polymer resin subsequently fed into the admixture where volatilization rates (low temperatures) generally permit the agglomeration of polymer resin following solidification. Where the rate of volatilization is too slow, the polymer resin will form a large sticky glob within the admixture. High volatilization rates will only yield more polymer particles.

The volatilization rate is effected by many variables including the heat input (temperature) into the admixture, the ratio of water to organic solvent solution in the admixture and the extent of agitation provided within the admixture. The heat input into the admixture will control the volatilization rate most strongly.

As the heat input per unit of polymer resin increases, the volatilization rate increases. The rate of heat input into the admixture is determined by the temperature and the volume of said admixture. Larger volumes of water and organic solvent solution per unit polymer resin provides higher rates of volatilization at a given temperature. The volatilization rate also increases with temperature. Temperatures of about 30° C. above the boiling point of the organic solvents within the organic solvent solution and higher can accelerate the volatilization rate to the extent where the polymer resin will not agglomerate, only form new particles. At temperatures of about 10° C. below the boiling point of the organic solvents within the organic solvent solution or lower, the rate of devolatilization will be so slow the polymer resin will form a large sticky glob. Utilizing quantities of water and organic solvent per unit polymer beyond the ranges specified herein will also provide undesirable volatilization rates. In addition, operating outside of more than one of the preferred ranges for temperature and polymer concentration within the organic solution or the admixture may not result in agglomeration of the polymer.

Maintaining the temperature within the preferred range will provide solidification of the resin followed by agglomeration onto these solids where the concentration of polymer within the organic solution feed and the admixture falls within the preferred ranges. When operating outside of the preferred concentrations for polymer, lower temperatures may be necessary to provide agglomeration at higher concentrations and higher temperatures may be necessary to provide agglomeration at lower concentrations.

The ratio of water to organic solvent solution in the admixture is a contributing factor in determining the volatilization rate. The volatilization rate increases as the ratio of water to organic solvent solution increases at the same temperature. It is preferable to maintain this ratio as low as possible to enhance the efficiency of the process. A ratio having a value within the range of 10 to 0.15 is preferred.

The degree of agitation also effects the volatilization rate. The volatilization rate will be increased as agitation increases because of improved dispersion and heat transfer. In addition, the increased agitation will contribute to the heat input into the system due to heat of friction.

The volatilization rate may be varied during the process by controlling the variables above, such as the heat input. It may be desirable to vary the volatilization rate to generate more agglomeration sites and provide better control over the particle size.

It is possible to control the size of the polymer granules obtained from a given quantity of polymer resin. This is accomplished by controlling the number of particles obtained by solidification prior to agglomeration of polymer resin onto these particles. The number of particles obtained is controlled by selecting values for the rate of heat input per unit polymer feed rate of the organic solution and the degree of agitation. Higher values for the agitation and temperature and lower values for the feed rate of the organic solution provide more polymer particles.

The polymer granules formed within the admixture are preferably recovered near the top surface of the admixture at a continuous rate with a volume of water that corresponds to the feed rate of the aqueous solution. This ensures the admixture is not starved or overfilled with water.

Once the recovered polymer granules within the admixture have reached the limits of a desirable size, further growth of these granules can be prevented by interrupting the feed of organic solution and volatilizing the remaining organic solvents within the admixture. By volatilizing the remaining organic solvents, the surface of the granules becomes dry. These dry surfaces no longer provide agglomeration sites for the polymer resin. The granules preferably have a size greater than 500 microns when dried to avoid further agglomeration. Smaller granules may become wet very quickly upon introducing more organic solvent solution.

To ensure the unrecovered granules are dry, volatilization of the organic solution from the admixture is preferably continued for about 1 to 10 minutes after the feed of organic solvent solution is interrupted. This preferred range is applicable when the admixture is at a temperature of about 10° below to 30° above the boiling point of the organic solvents in said organic solution. Where higher temperatures are utilized, the period of time necessary to dry the unrecovered granules may be shortened.

Once the unrecovered granules are dry, the organic solvent solution feed of polymer resin continues. In the absence of agglomeration sites, the polymer resin in the initial feed will solidify to form fine particulates. Polymer resin subsequently fed into the admixture will agglomerate onto these fine particulates because they are wet. The unrecovered dry granules will eventually exit the admixture without much further growth.

Continuously stirred vessels with high impeller tip speeds can be utilized in the process of this invention. The aqueous solution feed can be fed into these continuous stirred vessels through a conventional inlet. The organic solution of polymer is preferably fed at an inlet near the bottom. It is preferable to maintain the aqueous solution feed into the vessel continuous.

The polymer granules produced may be recovered from the admixture with water through a conventional outlet and then separated by conventional liquid-solids separation techniques, such as centrifugation, filtration, screening and the like. These granules may be dried if desired prior to use within subsequent processing equipment. The solid polymer granules typically exhibit a low residual solvent and water content upon removal from the aqueous slurry. The granule sizes typically vary over a range of about 500 to 5,000 microns and exhibit a narrow size distribution even though the process is operated continuously. The granules are porous and conducive to removal of water and residual solvent by conventional drying techniques. The polycarbonate granules obtained are of high density, typically having a bulk density within the range of about 0.15 to 0.60 grams per cubic centimeter.

The following example is provided to illustrate an embodiment of this invention. It is not intended to limit the scope of this invention to the embodiment described.

EXPERIMENTAL

The volatilization vessel used below was an unbaffled, glass vessel (4⅜"×10" high) with an inlet port near the bottom for feeding the organic solvent solution feed of polymer. The vessel was kept open to the atmosphere within a constant temperature bath to maintain temperatures in the system. The aqueous solution feed (water) required for the operation was fed through the top of the vessel at a continuous rate, while the organic solvent solution feed of polymer was fed into the vessel with interrupted flow. The polymer solution feed was kept cooled to avoid plugging of the feed line by passing chilled water through the coils around the feed line. The impeller used to provide agitation was a single strip impeller (3⅜" diameter×½" width×1/16" thick).

EXAMPLE I

The bath temperature was controlled to maintain the temperature of the vessel contents (admixture) at about 40° C. throughout the run. The impeller speed was maintained at about 4000 rpm throughout the run. For start up, the vessel was filled with 1000 ml of water and water was fed continuously at a rate of about 20 ml/minute. The organic solvent solution feed utilized was 15% by weight polycarbonate in methylene chloride. The organic solvent solution feed was fed continuously for 25 minutes at a rate of about 20 ml/minute and was then turned off for 5 minutes. The organic solvent solution feed was commenced again for another 25 minutes and turned off again. This cycle proceeded for 9 hours. The granular effluent slurry was withdrawn continuously throughout the run as an overflow. The slurry was drained, centrifuged and dried to recover the polycarbonate granules.

The granules were very uniform in size with no visible difference in the particle size or shape between the second hour and ninth hour samples. The average particle size was about 1000 μ. The granules exhibited a bulk density of about 0.32 gm/cc. The particle size distribution was very narrow with 90% of the particles having a size within the range of about 800 to 2400 microns.

EXAMPLES II-IV

These examples illustrate how a variety of polymers may be isolated by this invention. For these examples, the apparatus described in "Experimental" may be utilized.

In Example II, the bath temperature is maintained at about 92° C. and the impeller speed is maintained at about 25 ft./sec. For startup, the vessel is filled with about 1,000 ml of water and water is fed continuously at a rate of about 20 ml per minute. The organic solvent feed for this example consists of about 15% by weight polyphenylene ether in toluene which is fed continuously for 25 minutes into the volatilization vessel at a rate of about 15 ml per minute and is then turned off for five minutes. The organic solution solvent feed is commenced again for another 25 minutes and turned off again. This cycle proceeds for at least 3 hours to obtain a steady state. A granular effluent slurry is withdrawn continuously throughout the run as an overflow. The slurry is drained, centrifuged and dried to recover the polyphenylene ether granules. The granules are generally very uniform in size with no visible difference in the particle size or shape after the third hour. The average particle size is typically about 1,000 microns and the granules have a bulk density of about 0.30 gm/cm.

For Example III, the bath temperature is maintained at about 95° C. and the impeller speed is maintained at about 30 ft/sec. For startup, the vessel is filled with about 1,000 ml of water and water is fed continuously at a rate of about 20 ml per minute. For this example, the organic solvent solution feed consists of about 15% by weight high impact polystyrene in toluene which is fed continuously for 25 minutes into the volatilization vessel at a rate of about 15 ml per minute and is then turned off for five minutes. The organic solution solvent feed is commenced again for another 25 minutes and turned off once again. This cycle proceeds for at least 3 hours to obtain a steady state. A granular effluent slurry is withdrawn continuously throughout the run as an overflow. The slurry is drained, centrifuged and dried to recover the polystyrene granules.

The granules are generally very uniform in size with no visible difference in the particle size or shape after the third hour. The average particle size is typically about 1,000 microns and the granules have a bulk density of about 0.40 gm/cc.

For Example IV, the bath temperature is maintained at about 55° C. and the impeller speed is maintained at about 40 ft/sec. For startup, the vessel is filled with about 1,000 ml of water and water is fed continuously at a rate of about 20 ml per minute. For this example, the organic solvent solution feed consists of about 15% by weight cyclic polycarbonate having an average molecular weight of 1200 within methylene chloride. This organic solvent solution is fed continuously for 25 minutes into the volatilization vessel at a rate of about 15 ml per minute and is then turned off for five minutes. The organic solvent solution feed is commenced again for another 25 minutes and turned off again. This cycle proceeds for at least 3 hours to achieve a steady state. A granular effluent slurry is withdrawn continuously through the run as an overflow. The slurry is drained, centrifuged and dried to recover the polycarbonate granules. These granules are generally very uniform in size with no visible difference in the particle size or shape after the third hour. The average particle size is typically about 1000 microns and the granules have a bulk density of about 0.45 gm/cm.

Although the above examples have shown embodiments of the present invention, modifications of these embodiments will be obvious to those skilled in the art and are considered within the scope of this invention.

What is claimed is:

1. A process for isolating polymer resin from an organic solvent solution, said process comprising
   (a) feeding, with agitation, an organic solvent solution of about 1 to 50% by weight polymer resin into an aqueous solution feed to provide an admixture;
   (b) matching the feed rates for said aqueous solution and said organic solution to provide a weight ratio of water to polymer within the admixture having a value of from about 2-50;
   (c) volatilizing the organic solvents within the admixture at a rate sufficiently low to permit solidification of said polymer resin followed by agglomeration of said polymer resin to form polymer granules;
   (d) recovering solid polymer granules and said aqueous solution from said admixture;
   (e) interrupting the feed of said organic solvent solution of polymer resin upon formation of polymer granules within said admixture of a desired average size to dry the polymer granules; and
   (f) resuming the feed of said organic solvent solution of polymer resin upon drying substantially all of the polymer granules within said admixture.

2. A method as in claim 1 wherein the organic solvent solution contains about 10% to 30% by weight polymer resin.

3. A method as in claim 1 wherein the polymer is selected from the group consisting of polycarbonate, polystyrene, polyphenylene ethers, polyesters, polyetherimides and ethylene-propylene rubbers.

4. A method as in claim 1 wherein the weight ratio of water to polymer has a value maintained within the range of about 3 to 20.

5. A method as in claim 1 wherein the organic solent solution is comprised of solvents selected from the group consisting of methylene chloride, 1,1,2,2-tetrachloroethane, 1,2-dichloroethylene, chloroform, 1,1,2-trichloroethane, pyridine, chlorobenzene, dichlorobenzene, benzene, xylene, toluene, hexane, heptane, pentane and mesitylene.

6. A method as in claim 1 wherein admixing is achieved by a rotating impeller within an unbaffled vessel having a tip speed of at least about 5 feet per second.

7. A method as in claim 6 wherein said rotating impeller has a tip speed of about 10 to 70 feet per second and the organic solution of polymer is fed at an inlet located at the bottom of said vessel.

8. A method as in claim 1 wherein volatilization of said organic solvents is accomplished by maintaining the admixture at a temperature within the range of about 10° C. below to 30° C. above the boiling point of the organic solvents within said organic solution.

9. A method as in claim 1 wherein the organic solvent solution is comprised of methylene chloride and volatilization is accomplished by maintaining the admixture at a temperature within the range of about 30° C. to 70° C. at atmospheric pressure.

10. A method as in claim 1 wherein the organic solution is methylene chloride which contains about 10 to 30 weight percent polycarbonate, the weight ratio of water to polycarbonate within said admixture has a value within the range of about 3 to 20 and the temperature of the admixture is maintained within the range of about 35° to 50° C. at atmospheric pressure.

11. A method as in claim 1 wherein the organic solvent solution is comprised of toluene and volatilization is accomplished by maintaining the admixture at a temperature within the range of about 85° C. to 100° C. at atmospheric pressure.

12. A method as in claim 11 wherein the toluene solution contains about 10 to 30 weight percent polyphenylene ether resin, the weight ratio of water to total polyphenylene ether within said admixture has a value within the range of 3 to 20 and the temperature of the admixture is maintained below 100° C.

13. A method as in claim 11 wherein the toluene solution contains about 10 to 30 weight percent polystyrene resin, the weight ratio of water to total polystyrene within said admixture has a value within the range of 3 to 20 and the temperature of the admixture is maintained below 100° C.

14. A method as in claim 1 wherein the organic solvent solution is comprised of hexane and volatilization is accomplished by maintaining the admixture at a temperature within the range of about 60° to 75° C. at atmospheric pressure.

15. A method as in claim 14 wherein the hexane solution contains about 5 to 20 weight percent ethylene propylene rubber resin and the weight ratio of water to total ethylene-propylene-rubber within said admixture has a value within the range of 3 to 20.

16. A method as in claim 10 wherein the organic solvent solution feed is interrupted once the unrecovered polycarbonate granules have reached an average size within the range of 1000-5000 microns.

17. A method as in claim 1 wherein the organic solvent solution feed commences after devolatilizing the unrecovered granules for about 1-10 minutes.

18. A method as in claim 1 wherein a desired size and size distribution of the solid polymer granules are obtained for a given quantity of polymer resin by controlling the values for the feed rate of said organic solvent solution feed, the feed rate of said aqueous solution feed, the temperature of said admixture and the degree of agitation.

19. A method as in claim 18 wherein the feed rate for said organic solvent solution feed is decreased during solidification of the polymer resin within said admixture.

20. A method as in claim 1 wherein the organic solvent solution feed is interrupted once the unrecovered polymer granules have reached an average size within the range of 1000-5000 microns.

21. A method as in claim 1 wherein the polymer granules are recovered continuously.

22. A method as in claim 21 wherein the aqueous solution feed is fed at a continuous rate.

* * * * *